United States Patent
Van De Sluis et al.

(10) Patent No.: US 12,543,254 B2
(45) Date of Patent: Feb. 3, 2026

(54) POWER TRACK WITH INTEGRATED LINEAR LIGHT SOURCE CONTROLLED BASED ON INSERTED UNIT PROPERTIES

(71) Applicant: SIGNIFY HOLDING B.V., Eindhoven (NL)

(72) Inventors: Bartel Marinus Van De Sluis, Eindhoven (NL); Marcellinus Petrus Carolus Michael Krijn, Eindhoven (NL); Leendert Teunis Rozendaal, Valkenswaard (NL); Michel Cornelis Josephus Marie Vissenberg, Roermond (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 152 days.

(21) Appl. No.: 18/270,731

(22) PCT Filed: Dec. 14, 2021

(86) PCT No.: PCT/EP2021/085737
§ 371 (c)(1),
(2) Date: Jul. 2, 2023

(87) PCT Pub. No.: WO2022/148615
PCT Pub. Date: Jul. 14, 2022

(65) Prior Publication Data
US 2024/0090103 A1    Mar. 14, 2024

(30) Foreign Application Priority Data

Jan. 5, 2021 (EP) .................................... 21150147

(51) Int. Cl.
*H05B 47/155* (2020.01)
*H05B 47/105* (2020.01)
(Continued)

(52) U.S. Cl.
CPC ......... *H05B 47/155* (2020.01); *H05B 47/105* (2020.01); *H05B 47/165* (2020.01); *F21S 8/066* (2013.01); *F21V 21/35* (2013.01)

(58) Field of Classification Search
CPC .. H05B 47/155; H05B 47/165; H05B 47/105; F21S 8/066; F21V 21/35
See application file for complete search history.

(56) References Cited

U.S. PATENT DOCUMENTS

| 2016/0018092 A1 | 1/2016 | Knaapen et al. |
| 2016/0242251 A1 | 8/2016 | Newton et al. |

(Continued)

FOREIGN PATENT DOCUMENTS

| DE | 202013009490 U1 | 1/2015 |
| DE | 102018122361 A1 | 3/2020 |

(Continued)

*Primary Examiner* — Henry Luong

(57) ABSTRACT

The invention relates to a power track and a method controlling integrated lighting nodes of a power track. The power track comprising an elongated mounting rail (210), the mounting rail being configured to power a set of modules (3, 3a, 3b, 3c) mounted to the mounting rail, and a plurality of permanently mounted lighting nodes (220) fixated to the power track so as to be distributed along the mounting rail. The method comprising the steps of: acquiring light effect information (step S1) indicating a predefined light effect to be realized by the lighting nodes; determining module property information (step S2), the module property information indicating at least one of lighting properties of a lighting module mounted to the mounting rail and a position of a module mounted to the mounting rail; and controlling the lighting settings of at least one lighting node (step 3a, 3b) based on the module property information and the light effect information so as to generate the light effect indicated by the light effect information.

13 Claims, 3 Drawing Sheets

(51) Int. Cl.
*H05B 47/165* (2020.01)
*F21S 8/06* (2006.01)
*F21V 21/35* (2006.01)

(56) References Cited

U.S. PATENT DOCUMENTS

2017/0318649 A1  11/2017  Hall et al.
2019/0335560 A1  10/2019  Kurvers et al.

FOREIGN PATENT DOCUMENTS

| EP | 3397031 B1 | 10/2019 | |
|---|---|---|---|
| WO | 2014135555 A1 | 9/2014 | |
| WO | 2015049146 A1 | 4/2015 | |
| WO | 2016096615 A1 | 6/2016 | |
| WO | WO-2017102419 A1 * | 6/2017 | ............... F21S 4/24 |
| WO | WO-2017182458 A1 * | 10/2017 | |
| WO | 2018122010 A1 | 7/2018 | |

* cited by examiner

POWER TRACK WITH INTEGRATED LINEAR LIGHT SOURCE CONTROLLED BASED ON INSERTED UNIT PROPERTIES

CROSS-REFERENCE TO PRIOR APPLICATIONS

This application is the U.S. National Phase application under 35 U.S.C. § 371 of International Application No. PCT/EP2021/085737, filed on Dec. 14, 2021, which claims the benefit of European Patent Application No. 21150147.3, filed on Jan. 5, 2021. These applications are hereby incorporated by reference herein.

FIELD OF THE INVENTION

The invention relates to a method for controlling a power track, especially a lighting node of a power track, a power track comprising a plurality of permanently mounted lighting nodes, a control unit and a computer program product for performing the method.

BACKGROUND OF THE INVENTION

In the area of both indoor and outdoor lighting power tracks for mounting and powering lighting devices offers easier installation of lighting devices and enhanced flexibility. In most implementations, a power track comprises a mounting rail fitted with internal conductors forming a power bus to which inserted lights devices are connected upon mounting and installation. The power track is connected to a central power supply unit which supplies power to the entire power bus of the power track and thereby each inserted lighting device.

Lighting devices (such as light bulbs or spotlights) adapted to be fixated to a power rail may thus easily be installed at any position along the mounting rail of the power track. Thereby one or more lighting devices may easily be installed at any desirable position along the mounting rail without the need for adding any additional cables to supply power to the lighting devices. Consequently, adding, removing or repositioning lighting devices of a power rail is a simple procedure as the supply of power is enabled at every position along the mounting rail.

In most applications, large segments of the mounting rail are left without an installed lighting device leaving much of the elongated mounting rail unutilized. To occupy and make use of the empty segments between lighting devices installed along the mounting rail existing solutions introduce elongated linear light units, comprising e.g. LED-strips, of different lengths which may be installed to cover a portion or the entirety of the empty segments between two lighting devices. A benefit of adding elongated linear light units to fill the empty portions of the power track is that the entire length of the power track may be utilized and provide additional illumination alongside the lighting devices.

However, a problem with the existing solutions is that the benefits of simple and flexible reconfiguration of the lighting devices of a power track is at least partly defeated. If a set of lighting devices are installed along a mounting rail and the empty segments between the lighting devices are covered by a selection of linear light units it is inconvenient to move a lighting device or add an additional lighting device as a large portion of the mounting rail is occupied by linear light units. Accordingly, many linear light units will have to be rearranged or replaced (with shorter or longer counterparts) to accommodate a new setup of lighting devices wherein the empty portions between the lighting devices are again covered by linear light units.

WO-2017/102419 discloses a linear array of lighting nodes connected at different positions along a continuous supporting line. One or more dividers can be attached onto the supporting line, each between a respective neighboring pair of the lighting nodes. When attached to the supporting line, each divider enables detection of a position at which it is connected along the supporting line relative to the lighting nodes. Information related to the detected position can be provided to a controller to thereby divide the lighting nodes into different segments along the supporting line. The controller can then apply a different lighting effect to the illumination emitted by the lighting nodes in each of some or all of the different segments.

SUMMARY OF THE INVENTION

In view of the shortcomings of the existing solutions there is a need for an improved method for providing facilitated usability and flexibility for power tracks with linear lighting units which at least partially alleviates the issues of cumbersome reconfiguration as mentioned in the above.

It is an object of the present invention to overcome this problem, and to provide a method controlling lighting nodes of a power track and a power track comprising integrated lighting nodes. According to a first aspect of the invention there is provided a method for controlling lighting nodes of a power track. The power track comprising an elongated mounting rail, the mounting rail being configured to power a set of modules mounted to the mounting rail, and a plurality of permanently mounted lighting nodes fixated to the power track so as to be distributed along the mounting rail. The method comprising the steps of acquiring light effect information indicating a predefined light effect to be realized by the lighting nodes; determining module property information, the module property information indicating lighting properties of a lighting module mounted to the mounting rail (and optionally also a position of a module mounted to the mounting rail); and controlling the lighting settings of at least one lighting node based on the module property information and the light effect information so as to generate the light effect indicated by the light effect information.

By light effect information it is meant information instructing the light nodes to assume a light setting. The light effect information may not necessarily be complete lighting instructions in the sense that the light effect information comprises a specific intensity and color to be outputted but may merely be contextual instructions which together with the module state information (the context) may form a complete set of light settings instructions. For instance, the lighting effect information may be a 'following' effect, wherein the lighting nodes are instructed to follow the lighting properties of one or more modules mounted in the mounting rail. This may involve mimicking a dominant or average color and/or intensity outputted by the lighting modules or increasing/decreasing the outputted light intensity of lighting nodes close to the mounting position of a module. Moreover, the instructions in the lighting effect information may be so as to enable a contrasting lighting effect with respect to mounted lighting modules, an amplifying effect activating lighting nodes within a predetermined range of mounting position of a mounted module or a filling effect enabling each lighting nodes except those within a predetermined distance of a mounted module. The light effect may be dynamic in time and produce for example a strobing or rolling effect. The light effect may be instructions to turn a selection of lighting nodes ON or OFF based on the module property information. Additionally, some implementations further comprises a state following effect, wherein the lighting settings of the lighting nodes are further controlled based on the ON/OFF state of the lighting modules.

The lighting properties of a lighting module indicates at least one characteristic of the light emitted by the lighting module in an ON-state. For example, lighting properties may comprise, the color of the emitted light, the intensity of the emitted light, the type of lighting module (e.g. a lightbulb or a spotlight) which is emitting light, the direction of the emitted light or the distribution of the emitted light (e.g. omni-directional, beam angle, lobe distribution). In other words, the lighting properties indicates a characteristic other than the ON/OFF-state of the lighting module. The lighting properties may comprise future and/or past lighting properties meaning that the light effect and the control of the lighting nodes may be based also on future and/or past lighting properties.

The invention is at least partially based on the understanding that by determining the module property information of a module mounted to the mounting rail a generic contextual light effect may be generated by the lighting nodes for any set of mounted modules. That is, as opposed to controlling the mounted modules and the lighting nodes separately the lighting nodes may be contextually and automatically controlled to generate a light effect by the presence of modules mounted to the mounting rail of the power track. Changing the position of a module or lighting properties of a lighting module, for example by removing a module or changing the color of the light outputted by a lighting module, will not impede on the predefined light effect as the lighting settings of at least one lighting node are controlled accordingly. Thus, with light effect information acquired any set of modules may be mounted to the mounting rail with the lighting nodes being controlled so as to generate the light effect.

For example, if one lighting module is determined to output light in a first direction, the lighting nodes may be controlled based on the direction of their outputted light with respect to the first. So as to e.g. complement or contrast the lighting module in providing illumination in the first direction. If two or more lighting modules are present, the lighting nodes may be controlled to output the average or dominant color outputted by the lighting modules.

Moreover, the method may comprise determining that the position of a lighting node is located within a predetermined distance from the mounting position of a module and disabling the lighting node.

Determining that a lighting node is located within a predetermined distance from the mounting position of a module may comprise sensing the position of the module with respect to the mounting rail (and the lighting node) as will be described in detail in the below. Further, determining or sensing the position of a module with respect to the mounting rail (and the lighting nodes) may comprise the module shorting or opening a particular circuit when being mounted in the mounting rail. For instance, a plurality of circuits are arranged along the mounting rail and are each related to a mounting position of the mounting rail. A module shorting or opening one or more of the plurality of circuits enables determining or sensing of the mounted position with respect to the mounting rail. Moreover, the module and lighting nodes of the mounting rail may be configured such that a mounted module shorts and/or removes power from any lighting node in proximity to the mounting position of the module, and thereby disables the lighting node.

Alternatively or additionally, determining the position of a module relative the power track (and/or the mounting rail) may comprise using RF-based positioning determination means. The determined position may be an absolute position or a relative position indicating the proximity or distance of the module in relation to the power track.

Moreover, determining the position of a module may comprise determining the room in which the module is located or determining to which power track the module is mounted. For example, the predetermined distance between the module and the node may be that the node and the module are located in the same room or present on the same power track.

Lighting nodes in close proximity to, or being co-located, with a module mounted to the mounting rail may thus be turned off automatically. As the co-located lighting node(s) may be partially or completely blocked by the mounted module this has the benefit that the disabled co-located lighting nodes save energy and do not dissipate heat. Moreover, disabling co-located lighting nodes has the benefit that the modules are not illuminated in an inappropriate way (for example from the above) so as to generate an undesirable lighting effect by e.g. reflecting the light outputted by the lighting nodes.

Some implementations further comprise determining that a consecutive set of (one or more) lighting nodes is located between two consecutive modules and that the distance between the consecutive modules is below a predetermined threshold distance; and disabling the consecutive set of lighting nodes.

Similarly, it may be determined that a set of consecutive set of one or more lighting nodes is located between two consecutive modules and that the distance between the consecutive modules is above a predetermined threshold distance, in response to which the consecutive set of lighting nodes is enabled. Accordingly, only lighting nodes of segments of sufficient length are enabled. Additional lighting may be most needed in areas where the mounted modules are sparsely distributed while it is not necessary to employ the lighting nodes where the mounted modules are more densely distributed. The resulting lighting effect may be a light effect which complements or adds illumination where most needed.

Some implementations comprise determining that a consecutive set of (one or more) lighting nodes is located between two consecutive modules, wherein at least one out of the two consecutive modules is a lighting module; and controlling the consecutive set of lighting nodes located between the two consecutive modules to output a linear segment effect, the linear segment effect being based on the lighting properties of the at least one lighting module.

A linear light effect may be any light effect which is generated by a consecutive set (segment) of lighting nodes. For example, the lighting settings of the lighting nodes between the two consecutive modules may be controlled so as to mimic, complement or contrast the lighting properties of the at least one lighting module. The linear light effect may be a gradient linear light effect which varies over the set of consecutive lighting nodes. A fading/highlighting effect may be enabled by decreasing/increasing the intensity of the lighting nodes as the distance from the lighting module increases. In some implementations, the two consecutive modules delimiting the consecutive set of at least one lighting node are both lighting modules and the linear light effect generated by the lighting nodes enables a gradual transition (in terms of light settings e.g. color or intensity) between the two lighting nodes. The gradual transition may be enabled by interpolating the intensity and/or color of the lighting modules. Alternatively, a uniform and/or constant light setting is applied for the segment based on the lighting properties of the at least one lighting node. Moreover, a dynamic (time-variant) lighting effect may be rendered by the consecutive set of lighting nodes based on the lighting properties of the at least one lighting module. A dynamic lighting effect may be a slow, rapid and/or periodic change of the lighting settings of the lighting nodes based on the lighting properties of the at least one lighting module.

Some implementations, wherein the lighting properties comprises the illumination directionality of a module outputting a light, further comprise determining from the lighting properties an illumination directionality of a module outputting light with respect to the illumination directionality of a lighting node; and controlling the lighting settings of the lighting node based on the illumination directionality of the lighting module with respect to the illumination directionality of the lighting node, wherein the illumination directionality comprises at least one of: the illumination direction, and the illumination distribution.

Accordingly, the controlling of the lighting nodes may be based on a spatial light effect. The lighting nodes may be controlled based on lighting modules with a same, at least partially overlapping, or non-overlapping illumination direction and/or distribution. The light effect may e.g. be to complement, contrast or mimic lighting modules acting as ceiling or wall washer lights. By determining the illumination direction and/or distribution of a lighting module any lighting module acting as a washer light may be detected and the lighting nodes controlled accordingly to complement, contrast or mimic the lighting module(s) acting as a washer light.

Some implementations comprise determining from the lighting properties that a module is outputting an accent light; and controlling the lighting settings of a lighting node to mimic the lighting setting of the module outputting the accent light. An accent light may be determined as a lighting property of a lighting module that clearly differs from the lighting properties of other modules. For example, a lighting module outputting a color light while the other lighting modules output substantially white light may be determined to output an accent light. In addition to the accent light being determined by a color property the accent light may alternatively or additionally be determined from the module position and/or module orientation. For example, a lighting module being positioned and/or oriented so as to illuminate a ceiling or wall surface may be determined to be outputting an accent light.

Additionally or alternatively, the step of acquiring light effect information comprises acquiring light effect information for each mounting rail segment delimited by one of: two consecutive modules mounted to the mounting rail, and one module mounted to the mounting rail and an end of the mounting rail, wherein each lighting node of each segment is controlled so as to generate the light effect indicated by the acquired light effect information.

The light effect information may be manually predefined by a user by means of e.g. a light control app or program. The light effect information may be the same for the entire power rail or, by determining the position of the module(s) mounted to the mounting rail and thereby dividing the mounting rail into segments the light effect information may be acquired for each segment. For example, one segment may be associated with a light effect comprising the average color and intensity of all light modules mounted to the mounting rail while another segment may be associated with a light effect comprising complementing any lighting modules which illuminate the surface on which the power track is mounted. Yet another segment may output specific color at an intensity which is modulated by the sensed temperature of a temperature sensing module. The user may define a desired light effect for specific segments, if the mounting positions are automatically determined the desired light effects may be selected or created for the empty segments between the determined positions.

The lighting settings of a lighting node may operate at least one of the intensity of the light outputted by a lighting node light, the illumination direction of the light outputted by a lighting node, the illumination distribution of the light and the color of the light outputted by a lighting node.

By controlling the intensity, color, direction and/or distribution of the light outputted by the lighting nodes a large variety of lighting effects are enabled. Further, in some implementations the light effect may be generated with lighting nodes which are not individually controllable (for e.g. outputting only the dominant or accent color with all lighting nodes) while some implementations requires that the lighting nodes are individually controllable. Lighting elements suited for use as lighting nodes or as the lighting unit of a lighting module may feature active controllability of the illumination direction and/or distribution without changing the physical orientation of the element. For example, a lighting node may comprise a plurality of LEDs covered by a single lens and by changing which LED of the plurality of LEDs that is active, the illumination direction of the lighting node may be controlled. Similarly, by changing the number and selection of LEDs that are active the distribution (e.g. beam width or beam shape) of the outputted light may be controlled accordingly.

For example, the light effect may specify that the lighting nodes should complement or contrast a lighting module with a particular illumination direction. The illumination direction and/or distribution of the lighting nodes may thus be controlled to substantially illuminate the illumination direction of the lighting module with the particular illumination direction.

The lighting properties of lighting properties of a lighting module may comprise at least one of: the intensity of the light outputted by a lighting module, the illumination direction of the light outputted by a lighting module, the illumination distribution of the light outputted by a lighting module, the color of the light outputted by a lighting module, the type of a lighting module, the orientation of a lighting module.

The different types of lighting properties may be combined in any way and determining some lighting properties may be sufficient to deduce further lighting properties for the lighting module. For example, if the type of lighting module is determined to be a type with some inherent lighting properties such properties may be deduced from the type. For example, for a lighting module with a white LED or a sodium-vapor lamp the color of the outputted light from the lighting module may be deduced from the type information.

In some implementations, determining the module property information comprises sensing the module property information with sensor means. For instance, those sensor means may be integrated in the mounting rail and/or the modules, or may be (temporarily) present in the environment.

Sensing the module property information with sensor means facilitates efficient and accurate module property information determination. For instance, the sensor means may be a receiver adapted to sense wired (e.g. using DALI) or wirelessly (e.g. using Bluetooth, WiFi or mobile networks) conveyed data from the mounted modules, the data being indicative of the module properties. The sensor means may comprise a camera sensor (e.g. a stationary wide-angle camera nearby or a smartphone camera) used to scan the mounted modules so as to determine the lighting properties of any lighting module and/or the position of any module. The sensor means may comprise RF positioning detecting means and/or RF distance measuring means configured to determine the module property information. For example, the relative position between a mounted module and the power track may be measured using RADAR or analyzing the signal properties of RF signals conveyed between the sensors means and the mounted modules and/or the power track. To sense the position of any module mounted to the mounting rail the mounting rail (power track) may comprise two microphones, preferably arranged at each end of mounting rail, wherein the modules transmit an acoustic signal (e.g. an audible signal or an ultrasound signal) which is sensed by the microphones. The timings of the sensed audio signals may enable position determination e.g. by biangulation. The modules may be adapted to transmit the acoustic signal periodically and/or in response to being removed, inserted or repositioned along the mounting rail or in response to a configuration input, for instance, upon a user pressing a configuration button on the mounting rail or a user providing a (re-)configuration input via a control app. Additionally or alternatively, the mounting portion of the module and/or the mounting rail may be adapted to emit sound upon mounting/dismounting a module. For example, the mounting portion may be configured to emit a sound upon mechanically engaging or disengaging from the mounting rail. Accordingly, the modules do not necessitate means for actively emitting an audio signal (e.g. using speakers) as they are mechanically configured to emit e.g. a clicking sound upon being mounted or dismounted from the mounting rail. The sound emitted by the module and/or mounting rail as a module is mounted is recorded by two microphones of the power track. Analyzing and comparing the characteristics of the received sound (e.g. timings when each microphone received the emitted sound) enables position determining by e.g. biangulation. Accordingly, the sensor means may be provided in the mounted modules, the power track, in an external device or a combination thereof.

In some implementations, the module property information comprises sensor measurement data acquired by a sensor of a module mounted to the mounting rail.

A module may comprise a sensor, such as a temperature sensor, which outputs sensor data indicative of the sensor measurement. The sensor data may be comprised in the lighting property information and used to enable lighting effects which are further based on the sensor data. For example, the intensity of the light outputted by the lighting nodes is increased if a motion sensor detects motion. In another example, an audio sensor is used to generate light effect which depends on the sensed sound intensity. For example, the light effect may involve strobing the lighting nodes or controlling them to output a high intensity red color in response to high sound intensities being sensed.

According to a second aspect of the invention there is provided a power track, comprising: an elongated mounting rail, the mounting rail being configured to power a set of modules mounted to the mounting rail, a plurality of permanently mounted lighting nodes, the plurality of lighting nodes being fixated to the power track so as to be distributed along the mounting rail, and a lighting control unit. The lighting control unit being configured to: acquire light effect information, the light effect information indicating a predefined light effect to be realized by the lighting nodes, determine module property information, the module property information indicating lighting properties of a lighting module mounted to the mounting rail (and optionally also a position of a module mounted to the mounting rail); and control lighting settings of at least one lighting node based on the determined module state information and the light effect information so as to generate the light effect indicated by the acquired light effect information.

The control unit may be fixated to the power track or provided externally of the power track while being in wireless or wired communication with the lighting nodes distributed along the mounting rail of the power track.

The lighting nodes are permanently mounted to the power track and distributed along the mounting rail. The lighting nodes may be distributed along the entire mounting rail which means that for any mounting position of the mounted modules there will be integrated lighting nodes which fills the empty sections in between. Reconfiguring the modules of the power track by repositioning a module, removing a module or adding a module while maintaining full utilization of the power track is enabled as some or all of the empty segments will inherently be provided with lighting capabilities via the distributed lighting nodes distributed over the entire or at least a portion of the mounting rail.

At least a subset of the plurality of lighting nodes may be are arranged so as to illuminate a surface onto which the power track is adapted to be mounted, to act as surface washer lights. Lighting nodes arranged so as to act as washer lights enables lighting effects which are conveyed via diffuse reflection on the surface. Accordingly, the light outputted by the lighting nodes and any lighting modules may highlight the surface on which the power track is mounted.

At least a subset of the plurality of lighting nodes may be distributed inside the mounting rail so as to enable illumination of the surroundings of the power track through an opening slit of the mounting rail. The lighting nodes fixated inside the mounting rail means that the lighting nodes as such are protected and hidden from view from many observation angles of the power track. While still allowing the light outputted by the lighting nodes to pass through the opening of the mounting rail and be naturally in a predetermined direction with respect to the mounting rail. Furthermore, the modules installed in the mounting rail may interact mechanically and/or electrically with the lighting nodes so as to for example short a co-located lighting node or specify the position of the mounted module with respect to the lighting nodes.

According to a third aspect of the invention there is provided a computer program product comprising code for performing, when run on a computer module, the steps of the method according to the first aspect of the invention.

The invention according to the second and third aspects features the same or equivalent embodiments and benefits as the invention according to the first. Further, any functions described in relation to a method, may have corresponding structural features in a system or corresponding code for performing such functions in a computer program product. It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

DETAILED DESCRIPTION

Figure 1A:
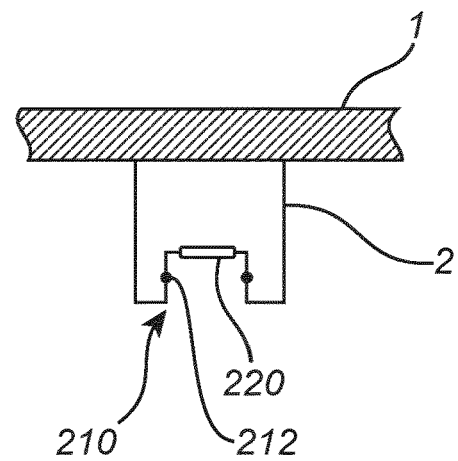
FIG. 1a illustrates a power track according to some implementations.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

FIG. 1 depicts a side view of an elongated power track 2 mounted to a surface 1. The surface 1 may be a ceiling. Alternatively, the surface 1 is a wall with the power track 2 extending in the vertical or horizontal direction or in a direction being a combination of the vertical and horizontal direction.

The power track comprises a mounting rail 210 extending along the power track 2. The mounting rail 210 is configured to support and power a set of modules mounted to the mounting rail 210. The shaping of the mounting rail may be that of a standardized type of rail, for example that of an H-, J- or L-type power track so as to enable use of standardized modules. Moreover, the mounting rail 210 may comprise one or more power bus conductors 212 which supplies power to any powered mounted module, such as a lighting module or a sensor module. By means of a separate conductor, or via the power bus conductor(s) 212, any mounted module may be enabled to communicate (e.g. by conveying lighting property, position and/or sensor information) with a control unit of the power track 2 by utilizing for example the DALI-protocol. Similarly, the control unit of the power track 2 may convey data to the modules and the lighting nodes, e.g. lighting instructions such as a requested light color or light distribution. However, alternatives for conveying data to the mounted modules include wirelessly conveying data to the modules directly from a user device (such as a smartphone) and indirectly conveying data to the modules over a wireless network (e.g. a WiFi network). In some implementations, the lighting properties of the lighting modules is controlled by manipulating switches or buttons provided on the lighting modules.

The power track 2 comprises a plurality of lighting nodes 220 permanently mounted to the power track 2 so as to be distributed along the mounting rail 210. The lighting nodes 210 may be a plurality of LEDs or any suitable lighting element. The lighting nodes 210 may be a linear light such as LED-strip, wherein the lighting element of each node optionally comprises color changing capabilities, intensity changing capabilities, illumination direction changing capabilities and/or illumination distribution changing capabilities. The lighting nodes 210 may be spaced apart with a distance, preferably the distance is equal to or smaller than the size of a mounting portion of the mounted modules. Moreover, the lighting nodes 210 may be combined with an optical layer in order to diffuse or further direct the outputted light.

In the embodiment depicted in FIG. 1a the lighting nodes 220 are distributed inside the mounting rail 210 so as to illuminate the surroundings of the power track 2 through an opening slit of the mounting rail 210. With the power track 2 mounted to a ceiling such a distribution of the lighting nodes 210 provides a linear downlight functionality integrated in the power track. The lighting nodes 210 may be placed and distributed differently, e.g. by being fixated to one of the (inner or outer) sides of the mounting rail and/or complemented by additional sets of lighting nodes 210 being distributed along different portions of the power track 2 or mounting rail 210.

Figure 1B:
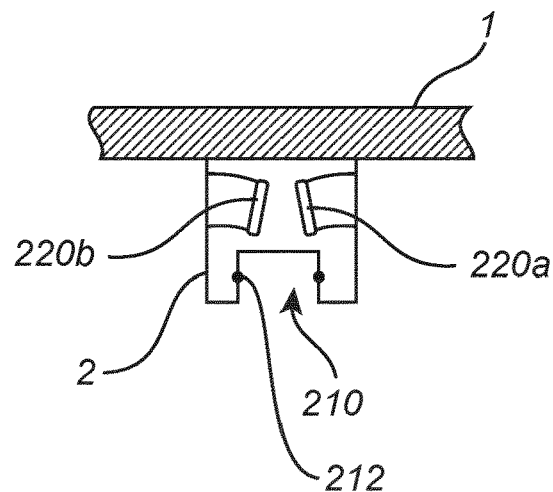
FIG. 1b illustrates a power track with lighting nodes arranged to act as surface washer lights according to some implementations.

With reference to FIG. 1b there is depicted a power track 2 comprising a plurality of permanently lighting nodes 220a distributed along mounting rail 210 and arranged so as to illuminate a surface 1 onto which the power track 2 is mounted. Accordingly, the lighting nodes 220a may act as surface (ceiling or wall) washer lights. In some implementations, the lighting nodes 220a are arranged to illuminate the surface of one side of the power track 2, or both sides of the power track simultaneously. In some implementations, two sets of distributed lighting nodes 220a, 220b are distributed so as to illuminate a respective side of the power track 2 and mounting rail 210. The two sets of lighting nodes 220a, 220b may each be individually controllable on a node-to-node basis. By directing (either by fixating or controlling the illumination direction/distribution) the lighting nodes 220a differently the nodes may be configured to act as washer lights of not the surface onto which the power track 2 is mounted but a neighboring surface, such as a neighboring wall surface (not shown).

Figure 2:
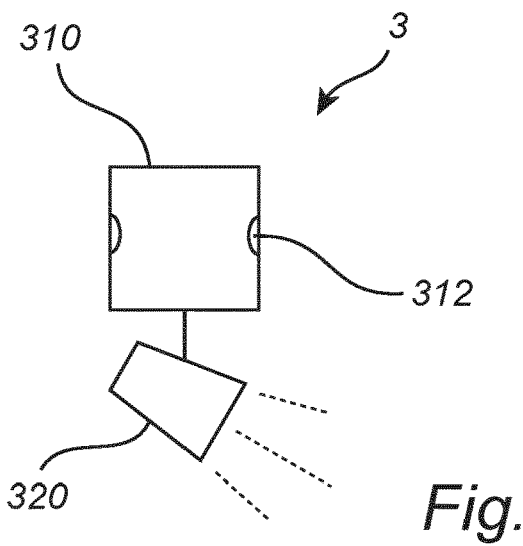
FIG. 2 illustrates a module adapted to be mounted to and powered by a mounting rail of a power track according to some implementations.

FIG. 2 depicts a module 3 according to some implementations. The module 3 may comprise a mounting portion 310 for engaging the mounting rail of a power track. The mounting portion 310 may comprise bus connectors 312 which enables the module to connect to the bus conductors of a mounting rail. Further, a module component 320 is comprised in, or fixated to, the mounting portion 310. For a lighting module the module component may be a lighting unit 320, for a sensor module the module component 320 may be a sensor and for other 'generic' module types the module component 320 may be a different component. The module component 320 may for example be a loudspeaker, disinfection unit, a fan for circulating the air or a wireless communication node (such as a wireless signal repeater). Examples of sensor types used in a sensor module comprises motion sensors, optical sensors, IR sensors, UV sensors, smoke sensors, audio sensors (microphones or ultra sound sensors), temperature sensors, light sensors, camera sensors, gas concentration detection sensors (such as carbon dioxide or carbon monoxide sensors). It is understood that a lighting module may further comprise a sensor and double as both a sensor module and a lighting module. Additionally, the module may further comprise a loudspeaker to also act as a 'generic' module providing other types of functionality.

The lighting properties of a lighting module may comprise the orientation of the lighting module. Some lighting modules may feature a lighting unit 320 mounted on an adjustable support member allowing the lighting unit to be oriented with one or more degrees of freedom relative the mounting portion 310 while some lighting units 320 are fixedly oriented with respect to the mounting portion 310 (and the mounting rail) once mounted. A lighting module may render dynamic lighting content and the light properties outputted by a lighting module may in general be dynamic with respect to time. The lighting nodes may be substantially instantaneously controlled based on the current lighting properties of the lighting nodes. In other implementations the light effect specifies a low-, high- or band-pass behavior for the lighting settings of the lighting nodes, meaning e.g. that the lighting settings of the lighting nodes is based on only the rapid lighting dynamics of the lighting modules (high-pass) or the slow lighting dynamics of the lighting modules (low-pass).

The lighting properties of a lighting module may comprise the type of lighting unit. The type of lighting module may for example be a spotlight, an LED point light, an LED matrix light, a lightbulb, a reflector light or a fluorescent lamp.

The lighting properties of a lighting module may comprise the illumination direction of the outputted light. The illumination direction may comprise the illumination direction in absolute terms with respect to the mounting rail or in relative terms with respect to the lighting unit 320. Some lighting units 320 may comprise individually controllable light sources and optics enabling steering of the illumination direction while some lighting units may feature an illumination direction fixed with respect to the lighting unit 320. For steered lighting units the current steered state of the lighting unit may be determined to constitute the (absolute or relative) illumination direction. In some implementations, the absolute illumination direction is determined by the orientation of the lighting module, while in some implementations the absolute illumination direction is determined by the orientation of the lighting module in combination with the type of lighting unit 320 and/or the current steered illumination direction of the lighting unit 320.

The lighting properties of a lighting module may comprise the distribution of the light outputted by the lighting unit 320 of the lighting module. The distribution may e.g. be substantially omnidirectional (e.g. for a point light unit 320) or be any distribution which may be described with a three-dimensional distribution function, such as a directivity function. The distribution may describe the angle, width or shape of the illumination distribution, e.g. a beam shape or beam angle, and the relative or absolute intensity of the outputted light for each direction. The distribution of the light may be determined by sensing the illumination distribution with sensor means, the distribution may be deduced from the module type or the distribution may be determined from the steered state. For example, the illumination distribution of a spotlight may be determined merely by determining the type of spotlight.

Figure 3A:
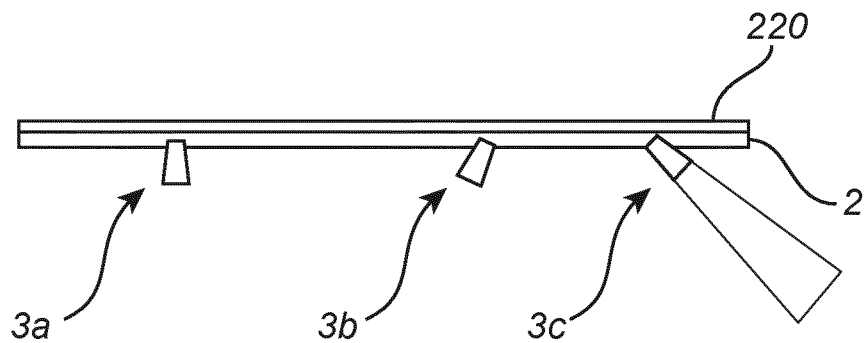
FIG. 3a illustrates a power track with mounted modules and lighting nodes outputting a constant light effect according to some implementations.

FIG. 3*a* depicts a power track 2 with lighting nodes 220 distributed along the mounting rail of the power track 2. A set of modules 3*a*, 3*b*, 3*c* are mounted to the mounting rail of the power track 2 at respective mounting positions. One or all of the modules 3*a*, 3*b*, 3*c* may be lighting modules, for example module 3*c* is a lighting module of a certain type or orientation outputting light with a certain intensity, color, direction, or distribution. The lighting nodes 220 are controlled to generate a particular lighting effect indicated by the lighting effect information and dictated by the lighting property information of the mounted modules. For example, the lighting effect information indicates that the intensity of the light outputted by the lighting nodes should be the light intensity outputted by the lighting module 3*c*. In another example the modules 3*a*, 3*b*, 3*c* are lighting modules 3*a*, 3*b*, 3*c* and the intensity of the lighting modules 3*a*, 3*b*, 3*c* is determined and the lighting nodes 220 are controlled to output the average light intensity. If a lighting module 3*a*, 3*b*, 3*c* is controlled to output a different intensity, a lighting module is removed, or an additional lighting module is mounted to the rail the lighting nodes are controlled accordingly to again generate the light effect, e.g. output the average light intensity. The light effect information may take the illumination direction and/distribution of lighting modules 3*a*, 3*b*, 3*c* into account and specify light effects which are dependent on lighting modules which illuminate the environment in a particular direction with respect to the lighting nodes 220. The light settings of the lighting nodes 220 may be the same for all nodes if the light effect is constant or uniform light effect, alternatively the lighting settings of the lighting nodes differs, are pixelated, if the light effect indicates a spatially variant or pixelated effect.

In some implementations the position of the modules 3*a*, 3*b*, 3*c* is determined which enables segmentation of the light effect generated by the lighting nodes 220. A segment being delimited by either two consecutive mounted modules or an edge module and an end of the mounting rail. For example, the light effect may be to only enable segments which are located between two consecutive mounted modules (e.g. between module 3*a* and 3*b* or between module 3*b* and 3*c*) while disabling lighting nodes located between an edge module and an end of the mounting track. Alternatively or additionally, only lighting nodes 220 between two lighting modules wherein the lighting modules are sufficiently spaced apart are enabled or segments which are close to a motion detector, detecting a motion, are enabled.

Figure 3B:
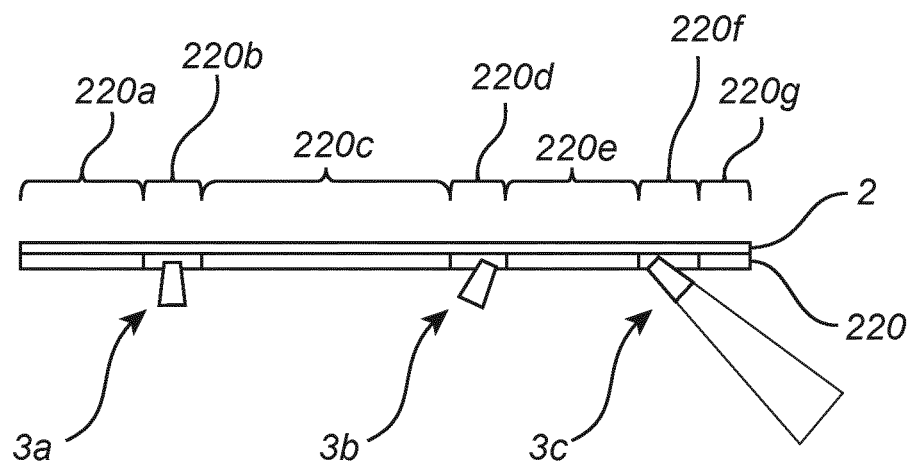
FIG. 3b illustrates a power track with mounted modules and lighting nodes outputting a pixelated light effect according to some implementations.

FIG. 3*b* illustrates a power track 2 with lighting nodes 220 distributed along the mounting rail. The modules 3*a*, 3*b*, 3*c* are mounted to the mounting rail and the lighting nodes 220 generates a light effect which is dependent on the mounting position of the modules 3*a*, 3*b*, 3*c*. By determining the position of the mounted modules 3*a*, 3*b*, 3*c* in the mounting rail generating a light effect comprising disabling lighting nodes within a predetermined distance from a mounted module is enabled. For example, lighting nodes within a range 220*b* surrounding module 3*a*, lighting nodes within a range 220*d* surrounding module 3*b* and lighting nodes 220 within a range 220*f* surrounding module 3*c* may be disabled. While lighting nodes 220 being located with a distance exceeding the predetermined distance from any module are enabled. In FIG. 3*b* lighting nodes within ranges 220*a*, 220*c*, 220*e* and 220*g* are sufficiently far from a mounted module and are enabled. While some modules may benefit from deactivating lighting nodes 220 in the proximity of their mounted position other modules, e.g. ornamental or decorative modules, may benefit from being highlighted by having lighting nodes 220 in the proximity enabled with the more distant lighting nodes being disabled 220.

Figure 4:
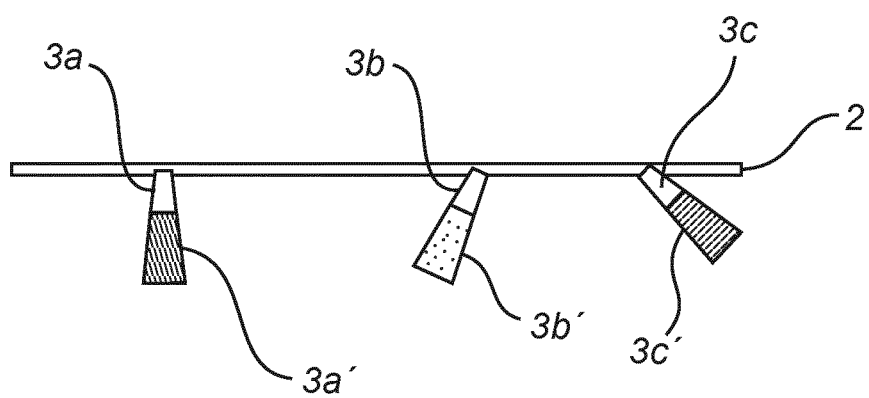
FIG. 4 illustrates a power track with mounted lighting modules outputting light with a respective lighting property.

FIG. 4 illustrates a mounting rail of a power track 2 to which three modules 3*a*, 3*b*, 3*c* are mounted at respective mounting positions. In determining the lighting property information, i.e. the lighting properties of at least one lighting module or the mounting position of at least one module mounted to the mounting rail, the lighting property information may be sensed by sensor means. For example, the power track 2 and the modules 3*a*, 3*b*, 3*c* may be sensed by acquiring a camera image (e.g. from a smartphone) wherein the lighting property information is identified from the camera image. In some implementations, the illumination 3*a'*, 3*b'*, 3*c'* of any lighting modules 3*a*, 3*b*, 3*c* and/or the lighting nodes 220 is controlled so as to aid identification of the lighting property information from an image. The identification being performed by the control unit of the user device. Additionally or alternatively, the modules actively convey data to the control unit which comprises the lighting property information. For example, an accelerometer or a potentiometer may be mechanically coupled to a lighting module so as to generate an output dependent on the orientation. Accelerometer and/or potentiometer data may be conveyed to the control unit as lighting property information for a module and used to determine e.g. the orientation of the lighting module.

Figure 5:
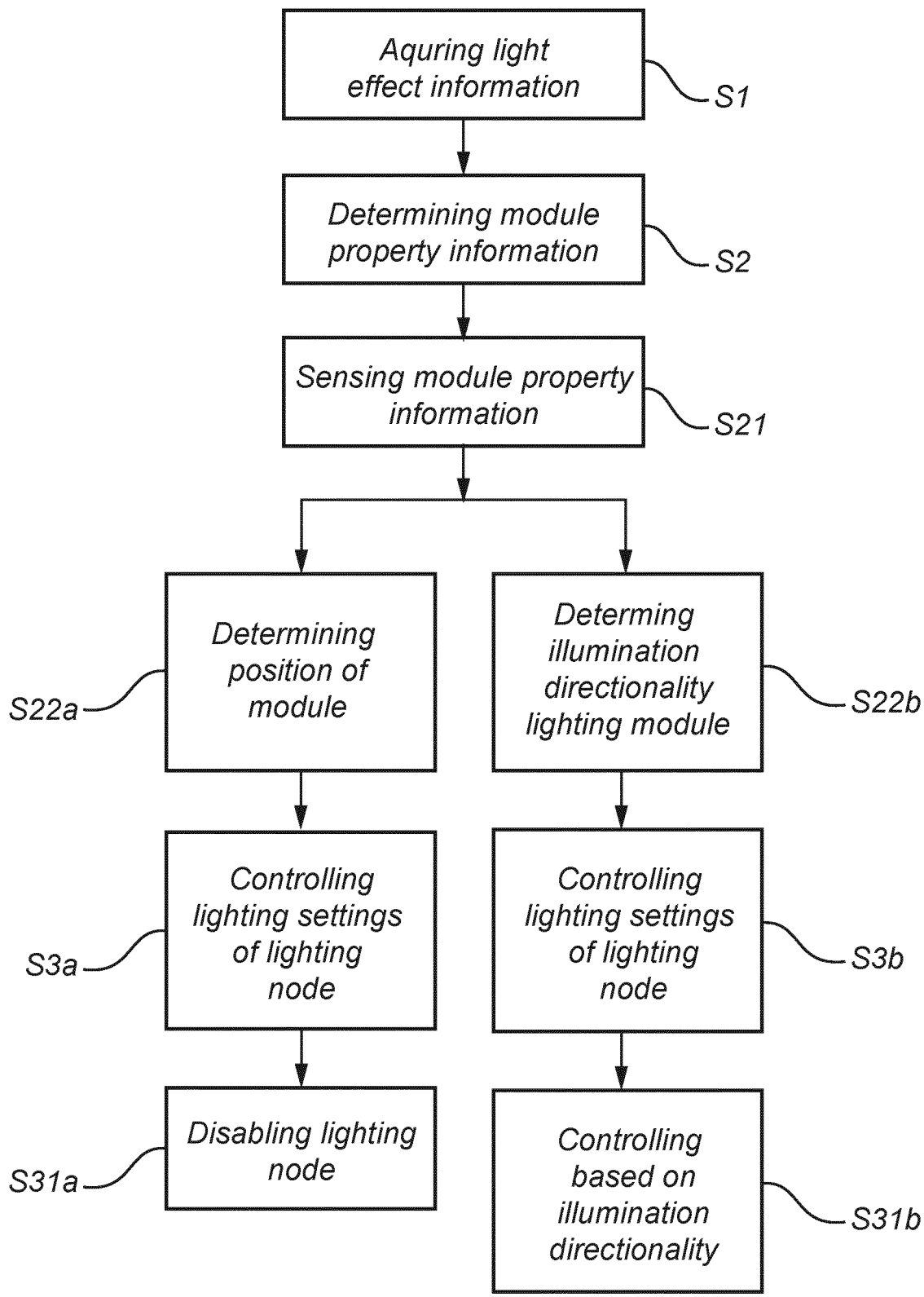
FIG. 5 is a flow chart depicting a method according to some implementations.

FIG. 5 illustrates a flow chart describing a method according to some implementations. At S1 light effect information is acquired. Optionally, the light effect information comprises light effect information for each set of (one or more) consecutive lighting nodes (a segment) being located between either two consecutive mounted modules or one mounted module and an end of the mounting rail. At S2 the module state information is determined comprising at least one of the lighting properties of a mounted lighting module and the mounting position of a module. Optionally, determining the module property information comprises step S21 involving sensing the lighting property information with sensor means. The sensor means may be e.g. a receiver of the control unit communicating with the modules, a user device and/or microphones provided on the mounting rail.

With acquired light effect information and determined module property information the method may go to step S3*a*, S3*b* and control the lighting settings of at least one lighting node so as to generate the light effect indicated by the light effect information. In some implementations, the light effect indicates that lighting nodes within a predetermined distance of a module should be disabled. Accordingly, the method may involve optional step S22*a* of determining the mounting position of a module and controlling the lighting settings of the lighting node may comprise optional step S31 involving disabling at least one lighting node being within the predetermined distance from the mounting position of a mounted module. Additionally or alternatively, the lighting effect information indicates a lighting effect wherein the illumination direction or distribution of any mounted lighting module should be considered so as to e.g. complement/contrast (with at least one lighting node) only lighting modules featuring an illumination direction and/or distribution that at least partially acts as a surface washer light. Accordingly, at optional step S22*b* the illumination directionality of at least one lighting module is determined. Step S3*b* of controlling the light setting of at least one lighting node may comprise the optional step S31*b* of controlling the lighting setting of at least one lighting nodes based on the directionality so as to generate light effect.

It is understood that the light effect information may specify a light effect requiring module property information indicating one or more properties of the mounted modules and the method may involve additional steps added in series or parallel to the steps depicted in FIG. 5. For example, a mounted module may comprise a sensor and the light effect information may specify a light effect which depends on the sensor data, the method would then additionally comprise the steps of acquiring the sensor data and controlling the lighting settings of at least one lighting node based on the acquired sensor data.

The person skilled in the art realizes that the present invention by no means is limited to the preferred embodiments described above. On the contrary, many modifications and variations are possible within the scope of the appended claims. For example, many of described light effects indicated by the light effect information may be combined so as to enable disabling of lighting nodes in close proximity of a module while also controlling a consecutive set of (one or more) lighting nodes located between two modules to output a linear light effect.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A method for controlling a plurality of permanently mounted lighting nodes of a power track, said power track comprising an elongated mounting rail, the plurality of permanently mounted lighting nodes being fixated to said power track so as to be distributed along the mounting rail, the mounting rail being configured to power a set of modules mounted to the mounting rail, the set of modules being enabled to be mounted at any position along the mounting rail of the power track, while being enabled to be reconfigured by repositioning a module, removing a module or adding a module, said method comprising the steps of:

acquiring light effect information (step S1) indicating a predefined light effect to be realized by the plurality of permanently mounted lighting nodes;

determining module property information (step S2), the module property information indicating at least one of lighting properties and a mounting position of a lighting module comprised in the set of modules mounted to the mounting rail;

controlling the lighting settings of at least one lighting node of the plurality of permanently mounted lighting nodes (step 3*a*, 3*b*) based on the module property information and the light effect information so as to generate the predefined light effect indicated by the light effect information; and wherein lighting properties of a lighting module of the set of modules comprises at least one of:

the intensity of the light outputted by the lighting module, the illumination direction of the light outputted by the lighting module, the illumination distribution of the light outputted by the lighting module, the color of the light outputted by the lighting module, the type of the lighting module, the orientation of the lighting module.

2. The method according to claim 1, further comprising the steps of:

determining (step S22*a*) that a lighting node of the plurality of permanently mounted lighting nodes is located within a predetermined distance from the mounting position of a module of the set of modules; and disabling (step S31*a*) the lighting node.

3. The method according to claim 1, further comprising the steps of:
- determining that a consecutive set of lighting nodes of the plurality of permanently mounted lighting nodes is located between two consecutive modules of the set of modules and that the distance between the consecutive modules is below a predetermined threshold distance; and
- disabling the consecutive set of lighting nodes.

4. The method according to any claim 1, further comprising the steps of:
- determining that a consecutive set of lighting nodes of the plurality of permanently mounted lighting nodes is located between two consecutive modules of the set of modules, wherein at least one out of the two consecutive modules is a lighting module; and
- controlling the consecutive set of lighting nodes located between the two consecutive modules to output a linear segment effect, the linear segment effect being based on the lighting properties of the at least one lighting module.

5. The method according to claim 1, wherein the lighting properties comprises the illumination directionality of a lighting module of the set of modules outputting a light, further comprising the steps of:
- determining (step S22b) from the lighting properties an illumination directionality of the lighting module outputting light with respect to the illumination directionality of a lighting node of the plurality of permanently mounted lighting nodes; and
- controlling (step S3b, S31b) the lighting settings of the lighting node based on the illumination directionality of the lighting module with respect to the illumination directionality of the lighting node, wherein the illumination directionality comprises at least one of:
  - the illumination direction, and
  - the illumination distribution.

6. The method according to claim 1, further comprising the steps of:
- determining from the lighting properties that a module of the set of modules is outputting an accent light; and
- controlling the lighting settings of a lighting node of the plurality of permanently mounted lighting nodes to mimic the lighting setting of the module outputting the accent light.

7. The method according claim 1, wherein the step of acquiring light effect information (step S1) comprises acquiring light effect information for each mounting rail segment delimited by one of:
- two consecutive modules of the set of modules mounted to the mounting rail, and
- one module of the set of modules mounted to the mounting rail and an end of the mounting rail, wherein each lighting node of the plurality of permanently mounted lighting nodes of each segment is controlled so as to generate the light effect indicated by the acquired light effect information.

8. The method according to claim 1, wherein lighting settings of a lighting node of the plurality of permanently mounted lighting nodes comprises at least one of:
- the intensity of the light outputted by the lighting node,
- the illumination direction of the light outputted by the lighting node,
- the illumination distribution of the light outputted by the lighting node, and
- the color of the light outputted by the lighting node.

9. The method according to claim 1, wherein determining (step S2) the module property information comprises sensing (step S21) the module property information with sensor means.

10. The method according to claim 1, wherein the module property information comprises sensor measurement data acquired by a sensor of a module of the set of modules mounted to the mounting rail.

11. A power track, comprising:
- an elongated mounting rail, the mounting rail being configured to power a set of modules configured to be mounted to the mounting rail at any position along the mounting rail of the power track, the mounting rail being configured to enable reconfiguration of the set of modules by repositioning a module, removing a module or adding a module,
- a plurality of permanently mounted lighting nodes, the plurality of permanently mounted lighting nodes being fixated to said power track so as to be distributed along the mounting rail,
- a lighting control unit, the lighting control unit being configured to:
- acquire light effect information, the light effect information indicating a predefined light effect to be realized by the plurality of lighting nodes,
- determine module property information, the module property information indicating lighting properties of a lighting module of the set of modules mounted to the mounting rail;
- control lighting settings of at least one lighting node of the plurality of permanently mounted lighting nodes based on the determined module state information and the light effect information so as to generate the light effect indicated by the acquired light effect information; and
- wherein at least a subset of said plurality of permanently mounted lighting nodes are distributed inside said mounting rail so as to enable illumination of the surroundings of the power track through an opening slit of the mounting rail.

12. The power track according to claim 11, wherein at least a subset of the plurality of permanently mounted lighting nodes are arranged so as to illuminate a surface onto which the power track is adapted to be mounted, to act as surface washer lights.

13. A computer program product comprising code for performing, when run on a computer module, the steps of the method according to claim 1.

* * * * *